United States Patent Office 3,585,691
Patented June 22, 1971

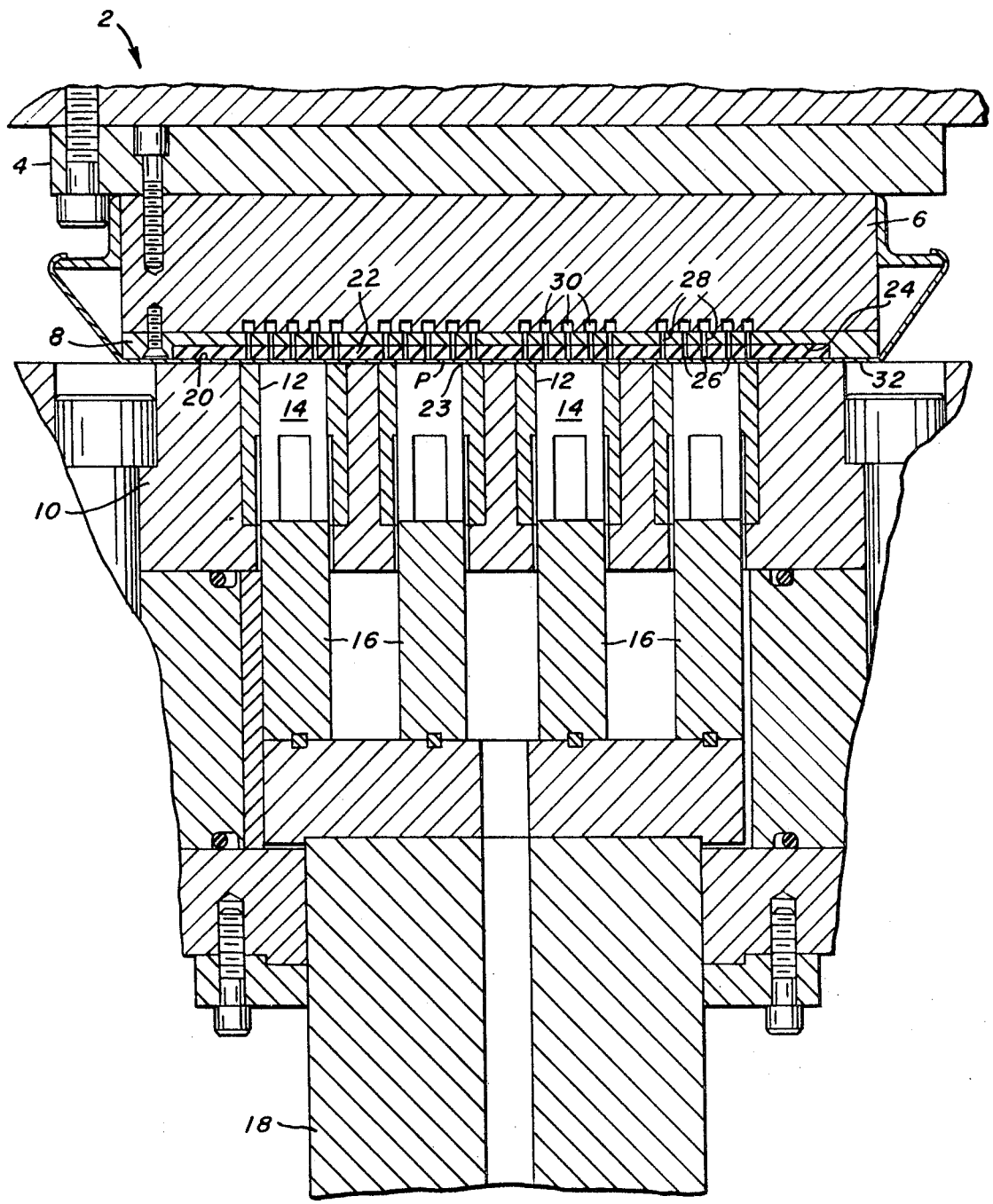

3,585,691
DIE CONSTRUCTION
Loren M. Wingblade, Woodstock, and Donald O. Schwennesen, Crystal Lake, Ill., assignors to The Arnold Engineering Company, Marengo, Ill.
Filed May 12, 1969, Ser. No. 823,685
Int. Cl. B29c 1/00
U.S. Cl. 18—34                                    5 Claims

ABSTRACT OF THE DISCLOSURE

Tooling for pressing compacts from moist powders including a die body containing one or more cavities for forming pressed parts closed by a semi-rigid, load-bearing seal of urethane having holes therein to carry off the moisture forced out during pressing and a fixture plate, having a recess to receive the seal, to support the seal during pressing to close the die cavities at their edges.

BACKGROUND OF THE INVENTION

This invention relates to the forming of parts in die tooling cavities, particularly the pressing of hard ferrite parts from moist powders wherein the die structure must contain means for removing the moisture forced out of the compact during the pressing operation. Conventional die tooling may include a steel fixture plate disposed on one end of the die tooling to provide a table against which a punch operates to compress the powder into a compact thereby forcing moisture through draining means contained within the fixture plate. For example, in pressing hard ferrite parts, several of which are formed at one time within the die tooling, the moisture is forced through slots or holes drilled in the metal fixture plate which are further communicated with a duct system to remove the moisture from the die area. In conventional pressing operations high pressures are employed which in the case of hard ferrite parts may approximate two tons per square inch. In order for the pressed parts to be of uniform size and quality, the fixture plate must bear upon the die tooling in a closely fitting relation thus forming a tight seal to prevent the powder from escaping from the die cavity. Conventional fixture plates are metallic to provide a strong table against which the compact may be pressed while still remaining rigid to insure uniformity in size and dimension of the pressed parts. These metal fixture plates, however, exhibit many disadvantages among which is the inability to seat tightly around the die cavities if there is any foreign material on the seating surfaces. Further disadvantages include the breakage or otherwise marring of the die tooling or die inserts due to high localized stresses which form if foreign material is present on the seating surfaces.

SUMMARY OF THE INVENTION

This invention relates to die tooling utilized to press parts of a powdered material wherein a fixture plate cooperates with die tooling to close one end of the die cavity within which the parts are formed including a semi-rigid load-bearing seal disposed between the fixture plate and the die tooling which accommodates itself to any irregularities such as might be caused by foreign material on the mating surfaces of the fixture plate or die tooling to form a uniform seal around the die cavity during the pressing operation. Such a semi-rigid, resilient load-bearing seal conforms to the irregularity on the mating surfaces reducing marring or burring of surfaces of the die tooling due to the presence of foreign material between the two mating surfaces. Further, the semi-rigid, resilient load-bearing seal reduces localized stresses which may occur if foreign material is present between the mating surfaces and thus reduces breakage of die tooling or die inserts, thereby increasing the effective life of the die and reducing tooling maintenance. Being essentially a replaceable seal to be utilized in conjunction with die fixture plates and die tooling, the load-bearing material provides a relatively inexpensive resurfacing of the mating parts further reducing maintenance costs. These and other objects of our invention will be apparent from the drawings and specifications which follow.

DESCRIPTION OF THE DRAWINGS

The figure illustrates the use according to my invention of a semi-rigid, resilient material in die tooling.

DESCRIPTION OF THE PREFERRED EMBODIMENT

Referring now to the drawing reference numeral 2 indicates pressed tooling for forming compacts of powdered material as is well known in the industry. Such pressed tooling would include an upper press structure 4 having a table 6 against which the powder is pressed. Table 6 may include a metal fixture plate 8 which would bear against the lower press structure 10 having therein die inserts 12 lining a die cavity 14 within which powdered material may be compressed by punch 16 in the forming operation. A plurality of punches 16 may be actuated by a ram 18 powered by means not shown but familiar to the art. Lower press structure 10 has a mating surface 20 which closely engages the metal fixture plate 8. According to our invention, a semi-rigid seal 22 is disposed in a recessed portion 24 of the metal fixture plate extending substantially over the mating portions of the metal fixture plate and mating surface 20. The material chosen for the semi-rigid seal in the embodiment disclosed is a urethane sheet of a high hardness such as K–315 available from Kaufmann Engineering Company, Chicago, Ill. The high hardness resilient material which is non-reactive with the powder material to be pressed must exhibit no substantial deformation of the seal as a result from the pressing force. The urethane sheet of the example has a hardness of 79D by durometer test. In the example disclosed the urethane sheet is expoxied within the recessed portion 24. Holes 26 are then drilled in the sheet communicating with holes 28 in the fixture plate and ducts 30 in the pressing table 6. Also in the preferred embodiment a filter cloth 32 is placed over the sheet 22 to inhibit the flow of the powdered material through the holes 26 and 28 during the pressing operation. In the example the filter cloth is a nylon screen having a mesh of about 400 which provides a smaller opening than holes 26 which have a diameter of 3/32".

In operation when lower press structure 10 is connected to upper structure 4 and secured for a pressing operation the semi-rigid seal 22 deforms slightly under the holding force of between press 10 and 4 to effectively seal cavity 14 from the surrounding die structure. Further if there are any foreign particles included on the mating surface 20 such as are indicated by P the semi-rigid sheet conforms to the protrusion of these particles without causing damage to the mating surface 20 while still maintaining the seal between cavity 14 and sheet 22 at corners 23.

We claim:
1. Die tooling for pressing moist powder into compacts comprising: a die body having at least one mold cavity disposed therein for pressing said compacts; a semi-rigid, load-bearing seal having drain holes therein and disposed in seating engagement with said die body across said mold cavities; a fixture plate having drain holes cooperating with said holes of said seal, in seating engagement on said seal and supporting said seal during the pressing of said compacts to close said die cavities at their edges.

2. Apparatus according to claim 1 which includes a screen of a mesh substantially finer than the drain holes, said screen disposed between said die body and said seal.

3. Apparatus according to claim 2 wherein said fixture plate is recessed to receive said seal.

4. Apparatus according to claim 3 wherein said seal is a resilient material having a hardness of at least 79 (by durometer test) to prevent substantial deformation under compression pressures.

5. Apparatus according to claim 4 wherein said seal is urethane.

References Cited

UNITED STATES PATENTS

| | | | |
|---|---|---|---|
| 2,231,126 | 10/1943 | Loomis. | |
| 3,030,661 | 4/1962 | Strong | 18—34 |
| 3,234,598 | 2/1966 | Quinn | 18—16 |
| 3,461,506 | 8/1969 | Rice et al. | 18—34 |

J. HOWARD FLINT, JR., Primary Examiner

U.S. Cl. X.R.

18—16, 47